(12) United States Patent
Liu et al.

(10) Patent No.: US 10,446,830 B2
(45) Date of Patent: Oct. 15, 2019

(54) HIGH-VOLTAGE TERNARY POSITIVE ELECTRODE MATERIAL FOR LITHIUM-ION BATTERY AND PREPARATION METHOD THEREOF

(71) Applicant: Sichuan FuHua New Energy High-Tech Co., LTD., Mianyang (CN)

(72) Inventors: Xingquan Liu, Chengdu (CN); Yiding Liu, Chengdu (CN); Zhenhua He, Suzhou (CN)

(73) Assignee: SICHUAN FUHUA NEW ENERGY HIGH-TECH CO., LTD., Mianyang (CN)

( * ) Notice: Subject to any disclaimer, the term of this patent is extended or adjusted under 35 U.S.C. 154(b) by 201 days.

(21) Appl. No.: 15/694,665

(22) Filed: Sep. 1, 2017

(65) Prior Publication Data

US 2018/0183045 A1    Jun. 28, 2018

(30) Foreign Application Priority Data

Dec. 28, 2016    (CN) .......................... 2016 1 1238223

(51) Int. Cl.
*H01M 4/1315* (2010.01)
*H01M 4/505* (2010.01)
(Continued)

(52) U.S. Cl.
CPC ........ *H01M 4/1315* (2013.01); *C01G 53/006* (2013.01); *C01G 53/66* (2013.01);
(Continued)

(58) Field of Classification Search
CPC .. H01M 4/1315; H01M 4/1391; H01M 4/505; H01M 4/525; C01G 53/006; C01G 53/66
(Continued)

(56) References Cited

U.S. PATENT DOCUMENTS

2004/0091779 A1 * 5/2004 Kang .................... C01G 53/006
                                                     429/231.1
2016/0260965 A1 * 9/2016 Wu ........................ H01M 4/139

FOREIGN PATENT DOCUMENTS

CN     103094576 A   *   5/2013
CN     103280576 A   *   9/2013
(Continued)

*Primary Examiner* — Sean P Cullen
(74) *Attorney, Agent, or Firm* — Gokalp Bayramoglu

(57) ABSTRACT

The present invention discloses a high-voltage ternary positive electrode material for lithium-ion battery and preparation method thereof. The chemical formula of the material is $LiNi_{0.6-x}Mg_xCo_{0.2-y}Al_yMn_{0.2-z}Ti_zO_{2-d}F_d$, wherein $0<x,y,z,d\leq 0.05$. The precursor of the positive electrode material is synthesized by gradient co-precipitation method and the positive electrode material is prepared by solid phase method. The content of nickel in the synthesized precursor particles has a gradient distribution from the inside to the outside. The obtained precursor is mixed and grinded evenly with the lithium source and the fluorine source at a certain ratio and put into the tube furnace. The obtained precursor is then pre-sintered in the oxygen-enriched air atmosphere and then heated up to be sintered, to obtain the target product. The positive electrode material for lithium-ion battery prepared by the method is free from impurity phase and has a good crystallinity, which is a high energy density positive electrode material.

9 Claims, 6 Drawing Sheets

---

Step 1: weighing a sample including a nickel source material, a magnesium source material, a cobalt source material, an aluminum source material, a manganese source material and, a titanium source material at a molar ratio of Ni: Mg: Co: Al: Mn: Ti = (0.6 - x): x: (0.2 - y): y: (0.2 - z): z; dividing the sample into two parts at molar ratios of (Ni + Mg): (Co + Al): (Mn + Ti) = 5: 2: 3 and 7: 2: 1 respectively, and dissolving the two parts respectively in an appropriate amount of deionized water to obtain a solution a and a solution b;

Step 2: mixing a sodium hydroxide solution at a certain concentration with ammonia at a certain concentration into the solution c;

Step 3: slowly and uniformly dropping the solution a and the solution c into a beaker containing deionized water, and then slowly and uniformly dropping the solution b and the solution c into the beaker and stirring continuously;

Step 4: adjusting pH to be around 11, then raising the temperature to 70°C and aging for 12 hours in a water bath;

Step 5: filtering, washing, and drying the aged product to obtain the precursor doped compound hydroxide.

(51) Int. Cl.
  *H01M 4/525* (2010.01)
  *C01G 53/00* (2006.01)
  *H01M 4/1391* (2010.01)

(52) U.S. Cl.
  CPC ......... *H01M 4/1391* (2013.01); *H01M 4/505* (2013.01); *H01M 4/525* (2013.01); *C01P 2002/72* (2013.01); *C01P 2004/03* (2013.01); *C01P 2006/40* (2013.01)

(58) Field of Classification Search
  USPC ..................................................... 429/231.3
  See application file for complete search history.

(56) References Cited

FOREIGN PATENT DOCUMENTS

| | | | | |
|---|---|---|---|---|
| CN | 103500827 | A | * | 1/2014 |
| CN | 105990577 | A | * | 10/2016 |
| CN | 106058238 | A | * | 10/2016 |
| CN | 106299326 | A | * | 1/2017 |

* cited by examiner

Step 1: weighing a sample including a nickel source material, a magnesium source material, a cobalt source material, an aluminum source material, a manganese source material and, a titanium source material at a molar ratio of Ni: Mg: Co: Al: Mn: Ti = (0.6 - x): x: (0.2 - y): y: (0.2 - z): z; dividing the sample into two parts at molar ratios of (Ni + Mg): (Co + Al): (Mn + Ti) = 5: 2: 3 and 7: 2: 1 respectively, and dissolving the two parts respectively in an appropriate amount of deionized water to obtain a solution a and a solution b;

Step 2: mixing a sodium hydroxide solution at a certain concentration with ammonia at a certain concentration into the solution c;

Step 3: slowly and uniformly dropping the solution a and the solution c into a beaker containing deionized water, and then slowly and uniformly dropping the solution b and the solution c into the beaker and stirring continuously;

Step 4: adjusting pH to be around 11, then raising the temperature to 70°C and aging for 12 hours in a water bath;

Step 5: filtering, washing, and drying the aged product to obtain the precursor doped compound hydroxide.

Fig. 1

Step 6: mixing the obtained precursor with a lithium source and a fluorine source at a certain ratio, grinding evenly and drying to put into a tube furnace;

Step 7: pre-sintering is conducted for 5-10 hours under 450-550°C at the oxygen-enriched air atmosphere; raising the temperature to 700-850°C for 10-18 hours, to obtain the target product.

Fig. 2

HIGH-VOLTAGE TERNARY POSITIVE ELECTRODE MATERIAL FOR LITHIUM-ION BATTERY AND PREPARATION METHOD THEREOF

CROSS REFERENCE TO RELATED APPLICATIONS

This application is based upon and claims priority to Chinese Patent Application No. CN201611238223.7(CN), filed on Dec. 28, 2016, the entire content of which is incorporated herein by reference.

TECHNICAL FIELD

The present invention relates to the field of lithium-ion batteries, and more particularly, to a high-voltage ternary positive electrode material for lithium-ion batteries and a preparation method thereof.

BACKGROUND

Lithium-ion batteries have the advantages of high voltage, high energy density, no memory effect and environmental friendliness, etc., and have been widely used in portable electronic devices. The earliest positive electrode material used for commercial lithium-ion batteries was $LiCoO_2$. However, $LiCoO_2$ electrode material has disadvantages because of a scarcity, high cost, and high environmental pollution of the Co natural resources. Further, the actual specific capacity of $LiCoO_2$ is lower, because overcharge leads to irreversible capacity loss and an increase in polarization voltage. With intensive researches on the inexpensive and excellent positive electrode materials, a positive electrode material for lithium-ion batteries which can replace the $LiCoO_2$ was discovered. The properties of $LiNiO_2$ are similar to that of $LiCoO_2$. Both of $LiNiO_2$ and $LiCoO_2$ belong to an R-3m space group and have $\alpha$-$NaFeO_2$ type layered structure. The price of nickel is lower than that of cobalt, the resources of nickel are more abundant than that of cobalt, and the actual specific capacity is high, and the nickel belongs to environment-friendly positive electrode material. However, $LiNiO_2$ has a poor thermal stability, and is prone to phase change during charge and discharge. Further, $Ni^{2+}$ the position of 3a of $Li^+$, which leads to cationic mixing, so that the electrochemical performance of the material declines sharply. Lithium manganate is an inexpensive positive electrode material with excellent safety and environmental performance, but the material has deficiencies of low specific capacity and energy density, and poor cycling performance at a high temperature. Therefore, a ternary material combining the performances of lithium cobaltate, lithium nickelate and lithium manganate was made. The nickel-cobalt-manganese ternary material can be regarded as the eutectic of lithium nickelate, lithium cobaltate and lithium manganate. Due to the co-doping of Co and Mn, $Ni^{3+}$ at the position of 3b in $LiNiO_2$ is replaced with Co and Mn to stabilize the layered structure, so that the electrochemical performance of the ternary material can be improved to a certain extent.

Because of the pursuit of high-energy-density power batteries for electric vehicles, the traditional nickel-cobalt-manganese ternary positive electrode material, such as NCM111 type and NCM523 type, cannot meet the requirements, and thus a lithium nickel-cobalt-manganate ($LiNi_{0.6}Co_{0.2}Mn_{0.2}O_2$) ternary material (referred to as NCM622) of higher capacity and energy density was made.

However, although the process of the lithium nickel-cobalt-manganate ($LiNi_{0.6}Co_{0.2}Mn_{0.2}O_2$) synthesized by a traditional solid phase method is simple, the particle size distribution of the product is nonuniform, so it is difficult to prepare a target product with a certain stoichiometric ratio, and the electrochemical performance of the product is poor. The co-precipitation method is a common method to synthesize the lithium nickel-cobalt-manganate in laboratories and the industry, and can be used to prepare the lithium nickel-cobalt-manganate ($LiNi_{0.6}Co_{0.2}Mn_{0.2}O_2$) material. The method has the advantages of a simple process, precise control of the experimental parameters, lower sintering temperature, moderate sintering time, and better particle dispersion. But the material prepared by the method fails to show a good electrochemical performance under high voltage of 4.5V. Due to increase in the charging voltage, the specific capacity and energy density of the material will be significantly increased or even multiplied, which is significantly important for the development of high energy density power batteries.

Although the cycling stability of the conventional lithium nickel-cobalt-manganate ($LiNi_{0.6}Co_{0.2}Mn_{0.2}O_2$) has been improved compared with $LiNiO_2$, it is not competitive in capacity and cycle stability compared with $LiCoO_2$ in the prior art.

SUMMARY OF THE INVENTION

The present invention provides a high-voltage ternary positive electrode material for lithium-ion batteries and a preparation method thereof. The positive electrode material for lithium-ion batteries has a high discharge specific capacity and excellent cycling stability performance in a charging condition of 4.5V high voltage. The preparation method can overcome the deficiencies of the solid phase synthesis method, such as non-uniform mixing, the difficulty in controlling the stoichiometric ratio and uneven distribution of the product particle size, etc. The prepared product has the advantages of high purity, good chemical uniformity, high crystallization quality, fine product particles, uniform distribution, excellent electrochemical performance and low manufacturing cost.

One technical solution of the present invention is realized as follows: A high-voltage ternary positive electrode material of a lithium-ion battery, wherein a molecular formula of the positive electrode material of the lithium-ion battery is $LiNi_{0.6-x}Mg_xCo_{0.2-y}Al_yMn_{0.2-z}Ti_zO_{2-d}F_d$, wherein 0<x, y, z, d<0.05.

Another technical solution of the present invention is realized as follows: A method for preparing a high-voltage ternary positive electrode material for lithium-ion battery, including:

step 1, weighing a sample including a nickel source material, a magnesium source material, a cobalt source material, an aluminum source material, a manganese source material, and a titanium source material at a molar ratio of Ni: Mg: Co: Al: Mn: Ti=(0.6−x): x: (0.2−y): y: (0.2−z): z; dividing the sample into two parts at molar ratios of (Ni+Mg): (Co+Al): (Mn+Ti)=5: 2: 3 and 7: 2: 1 respectively, and dissolving the two parts respectively in an appropriate amount of deionized water to obtain a solution a and a solution b;

step 2, mixing a sodium hydroxide solution with ammonia to form a solution c, wherein the solution c is composed of the sodium hydroxide at a concentration of 2.0 mol/L and the ammonia at a concentration of 0.5 mol/L;

step 3, slowly and uniformly dropping the solution a and the solution c into a beaker containing deionized water, and then slowly and uniformly dropping the solution b and the solution c into the beaker and placing the beaker in a water bath at a temperature of 50 to 80° C. and stirring continuously;

step 4, adding the ammonia into a mixed solution obtained from the step 3, adjusting pH to be around 11, and stirring continuously for 5 hours, then raising the temperature to 70° C. and aging for 12 hours;

step 5, filtering and washing a product obtained from the step 4 several times until no sulfate ion is detected using $BaCl_2$ solution, and then drying the product in a blast oven and grinding the product evenly;

step 6, mixing a precursor obtained from the step 5 with a lithium source and a fluorine source, grinding a mixture evenly and drying the mixture using absolute ethanol as a dispersant;

step 7, grinding the mixture obtained from the step 6 evenly, and putting the mixture in a tube furnace, raising a temperature to 450-550° C. at 5° C./min in an oxygen-enriched air atmosphere, and pre-sintering the mixture for 5-10 hours; then raising the temperature to 700-850° C. at 2° C./min, and sintering the mixture for 10-24 hours; grinding the product after natural cooling in the oxygen-enriched atmosphere, and obtaining the positive electrode material $LiNi_{0.6-x}Mg_xCo_{0.2-y}Al_yMn_{0.2-z}Ti_zO_{2-d}F_d$ of the lithium-ion battery, wherein the positive electrode material has a layered structure, and nickel has gradient distribution in particles.

As a preferred embodiment, in the step 6, a molar ratio of a lithium source material, the nickel source material, the magnesium source material, the cobalt source material, the aluminum source, a manganese source material, the titanium source material and a fluorine source material is (1-1.1): (0.6-x): x: (0.2-y): y: (0.2-z): z: d.

As a preferred embodiment, in the step 1, the nickel source material is at least one material selected from the group consisting of nickel sulfate, nickel nitrate, nickel acetate, nickel chloride and nickel hydroxide.

As a preferred embodiment, in the step 1, the magnesium source material is at least one material selected from the group consisting of magnesium sulfate, magnesium nitrate, magnesium acetate, magnesium chloride, magnesium oxide, and magnesium hydroxide.

As a preferred embodiment, in the step 1, the cobalt source material is at least one material selected from the group consisting of cobalt sulfate, cobalt nitrate, cobalt acetate, cobalt chloride and a hydroxide of cobalt and an oxide of cobalt.

As a preferred embodiment, in step 1, the aluminum source material is at least one material selected from the group consisting of aluminum nitrate, aluminum sulfate, aluminum chloride, aluminum hydroxide and an oxide of aluminum.

As a preferred embodiment, in the step 1, the manganese source material is at least one material selected from the group consisting of manganese sulfate, manganese nitrate, manganese acetate, manganese chloride and a hydroxide of manganese and an oxide of manganese, wherein the hydroxide of manganese and the oxide of manganese is any one of chemical manganese dioxide and electrolytic manganese dioxide.

As a preferred embodiment, in the step 1, the titanium source material is at least one material selected from the group consisting of butyl titanate, titanyl sulfate and titanium dioxide.

As a preferred embodiment, in the step 6, the lithium source material is at least one material selected from the group consisting of lithium carbonate, lithium nitrate, lithium acetate, lithium chloride and lithium hydroxide, and the fluorine source material is at least one material selected from the group consisting of lithium fluoride and ammonium fluoride.

According to the above-mentioned technical solutions, advantages of the present invention are:

1. The invention prepares the precursor material of nickel element using the gradient co-precipitation method, wherein the precursor material has gradient distribution and the concentration of the precursor material is gradually increased from inside to outside, which is beneficial to improve the discharge specific capacity of the positive electrode material.

2. As to the positive electrode material for lithium-ion batteries with layered structure $LiNi_{0.6-x}Mg_xCo_{0.2-y}Al_yMn_{0.2-z}Ti_zO_{2-d}F_d$ prepared by the present invention, the partial nickel element is replaced with a very small amount of magnesium element, the partial cobalt element is replaced with aluminum element, the partial titanium element is replaced with manganese element, and the partial oxygen element is replaced with fluorine element, to stabilize the crystal structure of the material, inhibit the structure collapse in case that a high proportion of lithium is removed, and enhance the ionic conductivity of the material.

3. The positive electrode material for lithium-ion batteries with layered structure $LiNi_{0.6-x}Mg_xCo_{0.2-y}Al_yMn_{0.2-z}Ti_zO_{2-d}F_d$ prepared by the present invention has a high discharge specific capacity and a better cycling performance. At room temperature, when the voltage range of charging and discharging is within 2.7-4.5V and the constant current charge and discharge ratio is 0.5 C, the initial discharge specific capacity of the positive electrode material for lithium-ion batteries is as high as 250.9 mAh·g$^{-1}$, the discharge specific capacity is still 186.3 mAh·g$^{-1}$ after 50 cycles of charging and discharging, and the capacity retention rate is 74.3%. The reversible lithium removal ratio of the material is larger than 90% and the energy density is above 960 Wh/kg. The mass energy density of the lithium-ion power battery produced by this material is expected to reach 350 Wh/kg.

BRIEF DESCRIPTION OF THE DRAWINGS

In order to more clearly illustrate the embodiments of the present invention or the technical solutions, the accompanying drawings needed in the embodiments or the description will be simply introduced as below. It will be apparent that the drawings in the following description are merely some examples of the present invention, and other drawings can be obtained by the ordinary person skilled in the art without creative work.

FIG. 1 is a process flow chart of preparing the precursor of the positive electrode material $LiNi_{0.6-x}Mg_xCo_{0.2-y}Al_yMn_{0.2-z}Ti_zO_{2-d}F_d$ of lithium-ion batteries of the present invention.

FIG. 2 is a process flow chart of preparing the positive electrode material $LiNi_{0.6-x}Mg_xCo_{0.2-y}Al_yMn_{0.2-z}Ti_zO_{2-d}F_d$ of lithium-ion batteries of the present invention.

DETAILED DESCRIPTION OF THE INVENTION

Figure 3:
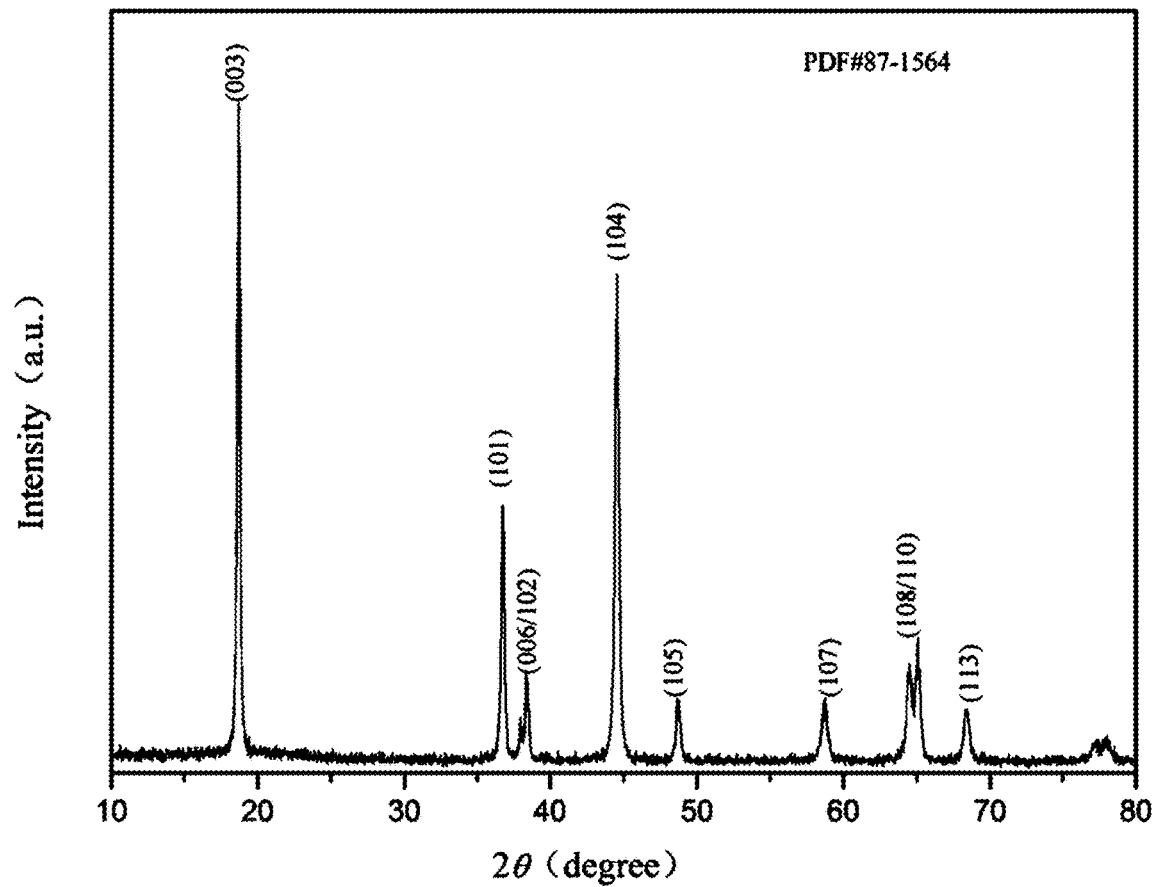
FIG. 3 is an XRD diagram of preparing the positive electrode material $LiNi_{0.6-x}Mg_xCo_{0.2-y}Al_yMn_{0.2-z}Ti_zO_{2-d}F_d$ of lithium-ion batteries of the present invention.
Figure 4:
FIG. 4 is a SEM diagram of preparing the positive electrode material $LiNi_{0.6-x}Mg_xCo_{0.2-y}Al_yMn_{0.2-z}Ti_zO_{2-d}F_d$ of lithium-ion batteries of the present invention.
Figure 5:
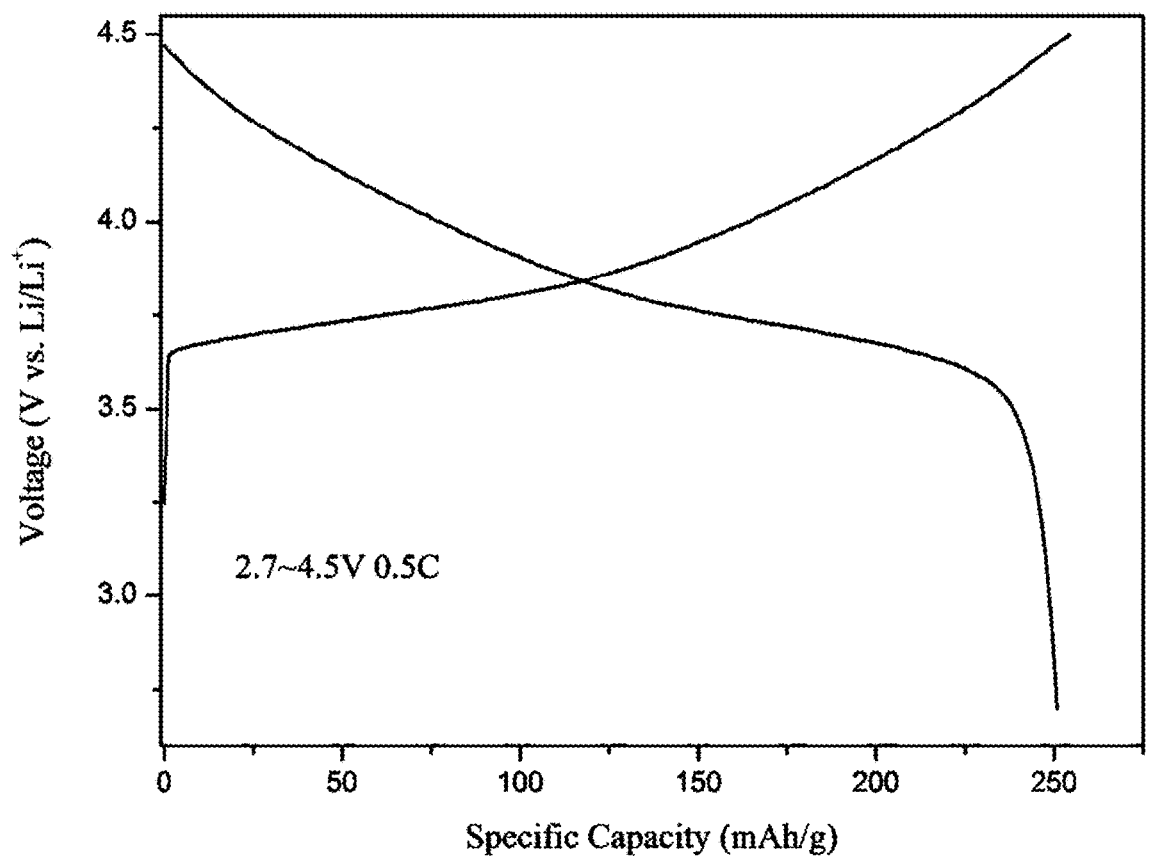
FIG. 5 is an initial charge and discharge curve of preparing the positive electrode material LiNi$_{0.6-x}$Mg$_x$Co$_{0.2-y}$Al$_y$Mn$_{0.2-z}$Ti$_z$O$_{2-d}$F$_d$ of lithium-ion batteries of the present invention, wherein the batteries are charged and discharged with a 0.5 C ratio constant current within a voltage range of 2.7-4.5V at room temperature.
Figure 6:
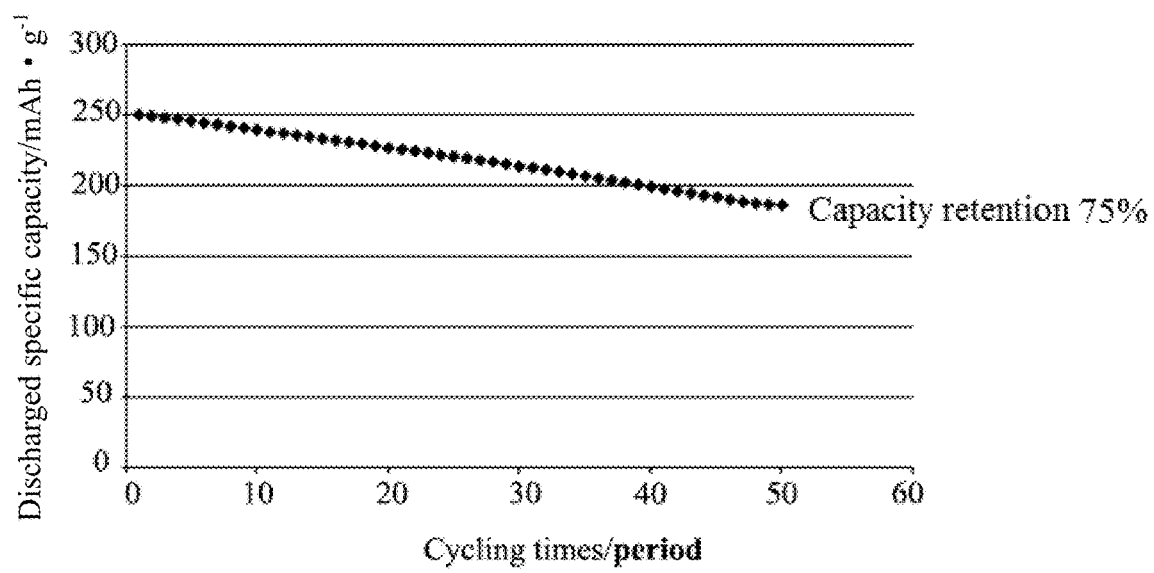
FIG. 6 is a cycling performance diagram of preparing the positive electrode material LiNi$_{0.6-x}$Mg$_x$Co$_{0.2-y}$Al$_y$Mn$_{0.2-z}$Ti$_z$O$_{2-d}$F$_d$ of lithium-ion batteries of the present invention, wherein the batteries are charged and discharged with a 0.5 C ratio constant current within a voltage range of 2.7-4.5V at room temperature.

The technical solutions described in the embodiments of the present invention will now be clearly and completely described, with reference to the accompanying drawings in the embodiments of the present invention. It will be apparent that the described embodiments are merely a part of the embodiments of the invention and are not intended to be exhaustive. Based on embodiments in the present invention, all other embodiments obtained by the ordinary person skilled in the art without creative work fall within the scope of the present invention.

Embodiment 1

When doping amounts of Mg, Al, Ti, and F are 0.02, 0.03, 0.02 and 0.02 respectively, a sample including the nickel source material, the magnesium source material, the cobalt source material, the aluminum source material, the manganese source material and the titanium source material is weighed at a molar ratio of Ni: Mg: Co: Al: Mn: Ti=(0.6−x): x: (0.2−y): y: (0.2−z): z, and divided into two parts. And then, the two parts are respectively dissolved at molar ratios of (Ni+Mg): (Co+Al): (Mn+Ti)=5: 2: 3 and 7: 2: 1 in an appropriate amount of deionized water to prepare 1 mol/L of the mixed sulfate solutions a and b. Sodium hydroxide solution and ammonia are mixed into a mixed solution referred to as a solution c, wherein the solution c is composed of the sodium hydroxide at a concentration of 2.0 mol/L and ammonia at a concentration of 0.5 mol/L. The prepared solutions a and b are respectively slowly dropped into a reaction vessel with the solution c and stirred continuously. The pH is adjusted to be around 11 by adding the ammonia. The reaction temperature is 50° C., and the co-precipitation is conducted for 5 hours, and then aging is conducted for 12 hours at 70° C. The product is then filtered and washed several times until no sulfate ion is detected using BaCl$_2$ solution, and then the product is dried and grinded to obtain spherical precursor powder. 0.108 mol of LiOH·H$_2$O, 9.1102 g of the precursor powder and 0.055 g of LiF are weighed and mixed together with absolute ethanol which acts as a dispersant, and fully ground evenly, and then placed in a blast oven to be dried and finely grind, and finally placed in a tube furnace. Temperature is raised to 500° C. at a rate of 5° C./min in an oxygen-enriched air atmosphere (flow rate 500 ml/min), so that pre-sintering is conducted for 5 hours under the temperature of 500° C., and then temperature is raised to 725° C. at a rate of 2° C./min and sintering is conducted for 15 hours. Finally, natural cooling is conducted in the oxygen-enriched atmosphere, and the product is taken out and grinded finely, to obtain the target product LiNi$_{0.58}$Mg$_{0.02}$Co$_{0.17}$Al$_{0.03}$Mn$_{0.18}$Ti$_{0.02}$O$_{1.98}$F$_{0.02}$ of the positive electrode material.

A constant current charge and discharge test is conducted on the prepared positive electrode material LiNi$_{0.58}$Mg$_{0.02}$Co$_{0.17}$Al$_{0.03}$Mn$_{0.18}$Ti$_{0.02}$O$_{1.98}$F$_{0.02}$ of lithium-ion batteries. According to the test results, it shows that the positive electrode material has an excellent discharge specific capacity. At room temperature, when the charge and discharge voltage range is 2.7-4.5V and the constant current charge and discharge ratio is 0.5 C, the initial discharge specific capacity of the positive electrode material for lithium-ion batteries can reach 250.9 mAh·g$^{-1}$. Further, the discharge specific capacity is still 186.3 mAh·g$^{-1}$ after 50 times of charging and discharging cycles, and the capacity retention rate is 74.3%.

Embodiment 2

When doping amounts of Mg, Al, Ti, and F are 0.01, 0.04, 0.01 and 0.05 respectively, a sample including the nickel source material, the magnesium source material, the cobalt source material, the aluminum source material, the manganese source material and the titanium source material is weighed at a molar ratio of Ni: Mg: Co: Al: Mn: Ti=(0.6−x): x: (0.2−y): y: (0.2−z): z, and divided into two parts. And then, the two parts are respectively dissolved at molar ratios of (Ni+Mg): (Co+Al): (Mn+Ti)=5: 2: 3 and 7: 2: 1 in an appropriate amount of deionized water to prepare the 1 mol/L of the mixed sulfate solutions a and b. Sodium hydroxide solution and ammonia are mixed into a mixed solution referred to as a solution c, wherein the solution c is composed of the sodium hydroxide at a concentration of 2.0 mol/L and ammonia at a concentration of 0.5 mol/L. The prepared solutions a and b are respectively slowly dropped into a reaction vessel with the solution c and stirred continuously. The pH is adjusted to be around 11 by adding the ammonia. The reaction temperature is 60° C., and the co-precipitation is conducted for 5 hours, and then aging is conducted for 12 hours at 70° C. The product is then filtered and washed several times until no sulfate ion is detected using BaCl$_2$ solution, and then the product is dried and grinded to obtain spherical precursor powder. 0.105 mol of LiOH·H$_2$O, 9.1062 g of the precursor powder and 0.128 g of LiF are weighed and mixed together with absolute ethanol which acts as a dispersant, and fully grinded evenly, and then placed in a blast oven to be dried and finely grind, and finally placed in a tube furnace. Temperature is raised to 500° C. at a rate of 5° C./min in an oxygen-enriched air atmosphere (flow rate 500 ml/min), so that pre-sintering is conducted for 5 hours under 500° C. And then temperature is raised to 725° C. at a rate of 2° C./min and sintering is conducted for 15 hours. Finally, natural cooling is conducted in the oxygen-enriched atmosphere, the product is taken out and grinded finely, to obtain the target product LiNi$_{0.59}$Mg$_{0.01}$Co$_{0.16}$Al$_{0.04}$Mn$_{0.19}$Ti$_{0.01}$O$_{1.95}$F$_{0.05}$ of the positive electrode material.

A constant current charge and discharge test is conducted on the prepared positive electrode material LiNi$_{0.59}$Mg$_{0.01}$Co$_{0.16}$Al$_{0.04}$Mn$_{0.19}$Ti$_{0.01}$O$_{1.95}$F$_{0.05}$ of lithium-ion batteries. According to the test results, it shows that the positive electrode material still has an excellent discharge specific capacity and better cycling performance.

Embodiment 3

When doping amounts of Mg, Al, Ti, and F are 0.05, 0.05, 0.05 and 0.05 respectively, a sample including the nickel source material, the magnesium source material, the cobalt source material, the aluminum source material, the manganese source material and the titanium source material is weighed the sample at a molar ratio of Ni: Mg: Co: Al: Mn: Ti=(0.6−x): x: (0.2−y): y: (0.2−z): z, and divided into two parts. And then, the two parts are respectively dissolved at molar ratios of (Ni+Mg): (Co+Al): (Mn+Ti)=5: 2: 3 and 7: 2: 1 in an appropriate amount of deionized water to prepare 1 mol/L of the mixed sulfate solutions a and b. Sodium hydroxide solution and ammonia are mixed into a mixed solution referred to as a solution c, wherein the solution c is composed of the sodium hydroxide at a concentration of 2.0 mol/L and ammonia at a concentration of 0.5 mol/L. The prepared solutions a and b are slowly dropped into a reaction vessel with the solution c and stirring continuously. The pH is adjusted to be around 11 by adding the ammonia. The reaction temperature is 50° C., and the co-precipitation is conducted for 5 hours, and then aging is conducted for 12 hours at 70° C. The product is then filtered and washed several times until no sulfate ion is detected using $BaCl_2$ solution, and then the product is dried and grinded to obtain spherical precursor powder. 0.105 mol of $LiOH \cdot H_2O$, 9.0093 g of the precursor powder and 0.128 g of LiF are weighed and mixed together with absolute ethanol which acts as a dispersant, and fully grinded evenly, and then placed in a blast oven to be dried and finely grinded, and finally placed in a tube furnace. Temperature is raised to 500° C. at a rate of 5° C./min in an oxygen-enriched air atmosphere (flow rate 500 ml/min), so that pre-sintering is conducted for 5 hours under 500° C., and then temperature is raised to 725° C. at a rate of 2° C./min and sintering is conducted for 15 hours. Finally, natural cooling is conducted in the oxygen-enriched atmosphere, and the product is taken out and grinded finely, to obtain the target product $LiNi_{0.55}Mg_{0.05}Co_{0.15}Al_{0.05}Mn_{0.15}Ti_{0.05}O_{1.95}F_{0.05}$ of the positive electrode material.

A constant current charge and discharge test is conducted on the prepared positive electrode material $LiNi_{0.55}Mg_{0.05}Co_{0.15}Al_{0.05}Mn_{0.15}Ti_{0.05}O_{1.95}F_{0.05}$ of lithium-ion batteries. According to the test results, it shows that the discharge specific capacity of the positive electrode material is reduced, but the cycling performance is significantly improved. At room temperature, when the charge and discharge voltage range is 2.7-4.5V and the constant current charge and discharge ratio is 0.5 C, the initial discharge specific capacity of the positive electrode material for lithium-ion batteries can reach 223.3 $mAh \cdot g^{-1}$. Further, the discharge specific capacity is still 189.8 $mAh \cdot g^{-1}$ after 50 times of charging and discharging cycles, and the capacity retention rate is 85%.

Above descriptions are merely preferred embodiments of the present invention, and is not intended to limit the scope of the present invention. Any modifications, equivalent substitutions, improvements etc. within the spirit and principles of the present invention should fall within the scope of the present invention.

What is claimed is:

1. A method for preparing a high-voltage ternary positive electrode material of a lithium-ion battery, wherein a molecular formula of the positive electrode material of the lithium-ion battery is $LiNi_{0.6-x}Mg_xCo_{0.2-y}Al_yMn_{0.2-z}Ti_zO_{2-d}F_d$, wherein $0<x\leq0.05$, $0<y\leq0.05$, $0<z\leq0.05$, and $0<d\leq0.05$;
wherein the method comprises the following steps:
   step 1: weighing a sample including a nickel source material, a magnesium source material, a cobalt source material, an aluminum source material, a manganese source material and, a titanium source material at a molar ratio of Ni: Mg: Co: Al: Mn: Ti=(0.6−x): x: (0.2−y): y: (0.2−z): z; dividing the sample into two parts at molar ratios of (Ni+Mg): (Co+Al): (Mn+Ti)=5: 2: 3 and 7: 2: 1 respectively, and dissolving the two parts respectively in deionized water to obtain a solution a and a solution b;
   step 2, mixing a sodium hydroxide solution with ammonia to form a solution c, wherein the solution c is composed of the sodium hydroxide at a concentration of 2.0 mol/L and the ammonia at a concentration of 0.5 mol/L;
   step 3, uniformly dropping the solution a and the solution c into a beaker containing deionized water, and then uniformly dropping the solution b and the solution c into the beaker and placing the beaker in a water bath at a temperature of 50 to 80° C. and stirring continuously;
   step 4, adding the ammonia into a mixed solution obtained from the step 3, adjusting pH to be 11, and stirring continuously for 5 hours, then raising the temperature to 70° C. and aging for 12 hours;
   step 5, filtering and washing a product obtained from the step 4 until no sulfate ion is detected using $BaCl_2$ solution, and then drying the product in a blast oven and grinding the product evenly;
   step 6, mixing a precursor obtained from the step 5 with a lithium source and a fluorine source, grinding a mixture evenly and drying the mixture using absolute ethanol as a dispersant; and
   step 7, grinding the mixture obtained from the step 6 evenly, and putting the mixture in a tube furnace, raising a temperature to 450-550° C. at 5° C./min in an oxygen air atmosphere, and pre-sintering the mixture for 5-10 hours; then raising the temperature to 700-850° C. at 2° C./min, and sintering the mixture for 10-24 hours;
   grinding the product after natural cooling in the oxygen atmosphere, and obtaining the positive electrode material $LiNi_{0.6-x}Mg_xCo_{0.2-y}Al_yMn_{0.2-z}Ti_zO_{2-d}F_d$ the lithium-ion battery, wherein the positive electrode material has a layered structure, and nickel has gradient distribution in particles.

2. The method for preparing a high-voltage ternary positive electrode material of a lithium-ion battery according to claim 1, wherein in the step 1, the nickel source material is at least one material selected from the group consisting of nickel sulfate, nickel nitrate, nickel acetate, nickel chloride and nickel hydroxide.

3. The method for preparing a high-voltage ternary positive electrode material of a lithium-ion battery according to claim 1, wherein in the step 1, the magnesium source material is at least one material selected from the group consisting of magnesium sulfate, magnesium nitrate, magnesium acetate, magnesium chloride, magnesium oxide, and magnesium hydroxide.

4. The method for preparing a high-voltage ternary positive electrode material of a lithium-ion battery according to claim 1, wherein in the step 1, the cobalt source material is at least one material selected from the group consisting of cobalt sulfate, cobalt nitrate, cobalt acetate, cobalt chloride and a hydroxide of cobalt and an oxide of cobalt.

5. The method for preparing a high-voltage ternary positive electrode material of a lithium-ion battery according to claim 1, wherein in the step 1, the aluminum source material is at least one material selected from the group consisting of aluminum nitrate, aluminum sulfate, aluminum chloride, aluminum hydroxide and an oxide of aluminum.

6. The method for preparing a high-voltage ternary positive electrode material of a lithium-ion battery according to claim 1, wherein in the step 1, the manganese source material is at least one material selected from the group consisting of manganese sulfate, manganese nitrate, manganese acetate, manganese chloride and a hydroxide of manganese and an oxide of manganese, wherein the hydroxide of manganese and the oxide of manganese is any one of chemical manganese dioxide and electrolytic manganese dioxide.

7. The method for preparing a high-voltage ternary positive electrode material of a lithium-ion battery according to claim 1, wherein in the step 1, the titanium source material is at least one material selected from the group consisting of butyl titanate, titanyl sulfate and titanium dioxide.

8. The method for preparing a high-voltage ternary positive electrode material of a lithium-ion battery according to claim 1, wherein in the step 6, a molar ratio of a lithium source material, the nickel source material, the magnesium source material, the cobalt source material, the aluminum source, the manganese source material, the titanium source material and a fluorine source material is $(1\text{-}1.1): (0.6-x): x: (0.2-y): y: (0.2-z): z: d$.

9. The method for preparing a high-voltage ternary positive electrode material of a lithium-ion battery according to claim 1, wherein in the step 6, a lithium source material is at least one material selected from the group consisting of lithium carbonate, lithium nitrate, lithium acetate, lithium chloride and lithium hydroxide, and a fluorine source material is at least one material selected from the group consisting of lithium fluoride and ammonium fluoride.

* * * * *